United States Patent
Bongards et al.

(10) Patent No.: US 10,287,649 B2
(45) Date of Patent: May 14, 2019

(54) COLD-ROLLED FLAT STEEL PRODUCT AND METHOD FOR THE PRODUCTION THEREOF

(71) Applicants: ThyssenKrupp Steel Europe AG, Duisburg (DE); ThyssenKrupp AG, Essen (DE)

(72) Inventors: Andreas Bongards, Duisburg (DE); Sigrun Voβ, Oberhausen (DE); Roland Sebald, Geldern (DE)

(73) Assignees: THYSSENKRUPP STEEL EUROPE AG, Duisburg (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 15/127,987

(22) PCT Filed: Mar. 18, 2015

(86) PCT No.: PCT/EP2015/055686
§ 371 (c)(1),
(2) Date: Sep. 21, 2016

(87) PCT Pub. No.: WO2015/144530
PCT Pub. Date: Oct. 1, 2015

(65) Prior Publication Data
US 2017/0218471 A1    Aug. 3, 2017

(30) Foreign Application Priority Data
Mar. 25, 2014    (EP) ..................................... 14161607

(51) Int. Cl.
*C21D 9/46* (2006.01)
*C21D 8/02* (2006.01)
(Continued)

(52) U.S. Cl.
CPC .............. *C21D 9/46* (2013.01); *B32B 15/013* (2013.01); *C21D 8/0205* (2013.01);
(Continued)

(58) Field of Classification Search
CPC ........ C21D 2211/002; C21D 2211/008; C21D 8/0226; C21D 8/0236; C21D 8/0273;
(Continued)

(56) References Cited

U.S. PATENT DOCUMENTS

2003/0106620 A1    6/2003    Nagataki et al.
2010/0043513 A1    2/2010    Hammer et al.

FOREIGN PATENT DOCUMENTS

CN    1566389 A    1/2005
CN    101130847 A    2/2008
(Continued)

OTHER PUBLICATIONS

English language Abstract for JP 2014019928 A listed above.
(Continued)

*Primary Examiner* — Veronica F Faison
(74) *Attorney, Agent, or Firm* — The Webb Law Firm (57) ABSTRACT

A cold-rolled flat steel product may have a yield strength Rp0.2 of not more than 320 MPa, a fracture elongation A80 of at least 20% and a microstructure having by percent area 62%-82% ferrite, 10%-30% martensite, 1.5%-8% residual austenite, and a sum total of not more than 10% other microstructure constituents. The flat steel product may comprise a steel alloy containing in percent by weight 0.06%-0.1% C; 0.15%-0.4% Si; 1.5%-2% Mn; 0.2%-0.5% Cr; not more than 0.1% Al; wherein the sum total of C, Si, Mn, and Cr is at least 2.3% and not more than 2.8%; wherein the sum total of Si and Al is not more than 0.4%; not more than 0.03% P; not more than 0.006% S; not more than 0.008% N; unavoidable impurities including not more than 0.0006% B,
(Continued)

not more than 0.02% V, and not more than 0.01% each of Nb and Ti, and not more than 0.1% each of Mo, Ni, and Cu; as well as iron. For production of such a flat steel product, a cold-rolled flat steel product may first be produced and then brought to 760-860° C. in a continuous run and kept at that temperature over an annealing period Gt for which, depending on the thickness D of the flat steel product, Gtu≤Gt≤Gto with $Gtu\ [s] = 3.56 * D^2\ [s/mm^2] - 5.1 * D\ [s/mm] + 9.8\ s$ $Gto\ [s] = -21.4 * D^2\ [s/mm^2] + 132.8 * D\ [s/mm] + 47\ s.$

18 Claims, 1 Drawing Sheet

(51) Int. Cl.
| | |
|---|---|
| C23C 2/06 | (2006.01) |
| C22C 38/02 | (2006.01) |
| C23C 2/02 | (2006.01) |
| C23C 2/28 | (2006.01) |
| B32B 15/01 | (2006.01) |
| C22C 38/00 | (2006.01) |
| C22C 38/06 | (2006.01) |
| C22C 38/42 | (2006.01) |
| C22C 38/44 | (2006.01) |
| C22C 38/46 | (2006.01) |
| C22C 38/48 | (2006.01) |
| C22C 38/50 | (2006.01) |
| C22C 38/54 | (2006.01) |
| C22C 38/58 | (2006.01) |

(52) U.S. Cl.
CPC ......... *C21D 8/0226* (2013.01); *C21D 8/0236* (2013.01); *C21D 8/0263* (2013.01); *C21D 8/0284* (2013.01); *C22C 38/001* (2013.01); *C22C 38/002* (2013.01); *C22C 38/02* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C23C 2/02* (2013.01); *C23C 2/06* (2013.01); *C23C 2/28* (2013.01); *C21D 2211/001* (2013.01); *C21D 2211/005* (2013.01); *C21D 2211/008* (2013.01)

(58) Field of Classification Search
CPC ...... C21D 8/0278; C21D 9/46; C22C 38/002; C22C 38/02; C22C 38/04; C22C 38/06; C22C 38/08; C22C 38/12; C22C 38/14; C22C 38/16; C22C 38/26; C22C 38/28; C22C 38/32
See application file for complete search history.

(56) References Cited

FOREIGN PATENT DOCUMENTS

| | | |
|---|---|---|
| EP | 2025282 A2 | 2/2009 |
| EP | 2392683 B1 | 12/2011 |
| JP | 7207413 A | 8/1995 |
| JP | 2002317245 A | 10/2002 |
| JP | 2014019928 A | 2/2014 |

OTHER PUBLICATIONS

International Search Report for International Patent Application No. PCT/EP2015/055686 dated May 28, 2015 (dated Jun. 16, 2015).
Wang et al., Metal Material and Heat Treatment, Programmed Textbook for Higher Vocational Colleges, Sep. 2010, pp. 112-114, Metallurgical Industry Press, Beijing, China.
Zhou et al., Properties of Materials for Steel Rails and Relevant Processes, Mar. 2005, pp. 40-42, China Railway Publishing House, Beijing, China.

COLD-ROLLED FLAT STEEL PRODUCT AND METHOD FOR THE PRODUCTION THEREOF

CROSS REFERENCE TO RELATED APPLICATIONS

This application is a U.S. National Stage Entry of International Patent Application Serial Number PCT/EP2015/055686, filed Mar. 18, 2015, which claims priority to European Patent Application No. 14 161 607.8 filed Mar. 25, 2014, the entire contents of both of which are incorporated herein by reference.

FIELD

The present disclosure relates to cold-rolled flat steel products having a yield strength of at least 320 MPa and to methods for producing same.

BACKGROUND

Flat steel products of the type in question here are typically rolled products such as steel strips or sheets, and blanks and plates produced therefrom.

High-strength flat steel products are of growing significance particularly in the field of automobile construction, since they enable particularly lightweight chassis and bodywork constructions. Depending on their susceptibility to corrosion, their site of use and the aggressiveness of the environment in which they are used, the flat steel products are used with a metallic protective coating. The low weight of high-strength flat steel products contributes not just to the optimal utilization of the technical performance capacity of the particular drive unit, but also promotes resource efficiency, optimization of costs and climate protection.

High strengths can be achieved in flat steel products by addition of relatively large amounts of strength-enhancing alloy constituents and suitable production methods. However, the costs associated with high alloy contents and complex production methods are at odds with the demand for products at minimum cost which can be produced in an economically viable and operationally reliable manner. It is therefore a key aim in the technical field to lower the production costs for high-strength flat steel products by dispensing with costly alloying elements, for example microalloying elements and molybdenum.

Alloying elements which are obtainable at lesser expense and can be added to high-strength steels for compensation of the for a minimization of the costly strength-enhancing alloying elements frequently lead, as a result of a tendency to grain boundary oxidation and to the formation of oxides at the surface of the steel sheet, to deterioration in the processing properties and surface characteristics. Therefore, it is possible with the known inexpensive alloying concepts in many cases to achieve the high strengths required, but not to assure the other properties such as good toughness, good embrittlement resistance characteristics, and optimal suitability for cold forming and for welding, which are expected of the flat steel products envisaged for automobile construction.

Grain boundary oxidation arises at temperatures above 500° C. as a result of penetration of oxygen, through diffusion processes, along the grain boundaries from the surface into the steel substrate. As it does so, the oxygen forms oxides with the elements having a higher oxygen affinity than iron, for example silicon, aluminum, manganese and chromium. This leads to distinct weakening of the grain boundaries and, in the advanced state, to the detachment of whole grains from the structure. Particularly in forming operations, these act as notches and thus lead to premature material failure. The situation is similar for coated material. The notch effect on grain boundary oxidation also exists in the case of coated material. It is additionally the case that the detachment of individual grains or whole grain layers greatly reduces coating adhesion and results in defects in the surface coating that extend as far as complete detachment of the surface coating.

One example of a flat steel product which is intended for automobile applications and is said to have bake-hardening properties is described in EP 2 392 683 B1. The flat steel product known from this publication consists of a steel containing, as well as iron and unavoidable impurities (in % by mass) more than 0.015% and less than 0.100% C, 0.01%-0.3% Si, more than 1.0% and less than 1.90% Mn, 0.015%-0.05% P, up to 0.03% S, 0.01%-0.5% undissolved Al, up to 0.005% N, less than 0.30% Cr, 0.0003%-0.005% B, less than 0.014% Ti, up to 0.1% Mo, up to 0.4% V, up to 0.015% Nb, up to 0.15% W, up to 0.1% Zr, up to 0.5% Cu, up to 0.5% Ni, up to 0.2% Sn, up to 0.2% Sb, up to 0.01% Ca, up to 0.01% Ce and up to 0.01% La. At the same time, the alloy of the steel should fulfill the following conditions: $2.2 \le (\% \text{Mn} + 1.3\% \times \% \text{Cr} + 8\% \text{P} + 150 \text{B*}) \le 3.1$ and $0.42 \le 8 \times \% \text{P} + 150 \text{B*}) \le 0.73$. B* is calculated by the formula $\text{B*} = \% \text{B} + \% \text{Ti} \times 0.2025 + \% \text{Al} \times 0.01$ and is set to 0.0022% when this formula for B* gives a value for B* greater than 0.0022%. % Mn, % Cr, % P, % B, % Ti and % Al in the formulae mentioned denotes the respective Mn, Cr, P, B, Ti and Al content of the alloy.

The microstructure of the known flat steel product alloyed in the manner set out above is additionally to have a microstructure composed of ferrite and a second phase consisting of martensite, residual austenite and optionally pearlite or bainite. The area proportion of the second phase is supposed to add up to 3-15 area %, and the proportion of the surface component of martensite and residual austenite in the total area component of the second phase is to be more than 70%. In addition, 50% or more of the area component of the second phase is to be present at a grain boundary triple point, where grains that are in contact with three or more ferrite grain boundaries are defined as second-phase grains present at the grain boundary triple point.

It is apparent from the working examples adduced in EP 2 392 683 B1 that the known flat steel products having such characteristics have tensile strengths of 430-594 MPa and yield strengths of 201-274 MPa. For production of such flat steel products, EP 2 392 683 B1 proposes a process in which a steel slab heated to 1100-1300° C. is hot-rolled at a finish rolling temperature between the Ar3 transition point and the Ar3 transition point +150° C., after the hot rolling is cooled at a cooling rate of at least 20 K/s to 640° C. and then is coiled at 400-620° C. Then the hot strip is cold-rolled with a degree of deformation of 50%-85%. The cold-rolled strip obtained is subjected to an annealing treatment in a continuous galvanizing and galvannealing line at an annealing temperature of more than 740° C. and less than 840° C., then cooled at an average cooling rate of 2-30 K/s from the annealing temperature to the temperature of a galvanization bath which is kept at 450-500° C. The strip which has thus been subjected to annealing treatment runs through the galvanization bath. The flat steel product leaving the galvanization bath is then, in a first variant of the known method, cooled down directly at an average cooling rate of 5-100 K/s to a temperature of 100° C. or, in a second variant of the known process, subjected to an alloying treatment in which it is kept within a temperature range of 470-650° C. for 30 seconds, in order then to be cooled back down to 100° C. at an average cooling rate of 5-100 K/s.

BRIEF DESCRIPTION OF THE TABLES AND FIGURE

Table 1 identifies compositions of inventive melts A-H and compositions of two non-inventive comparative melts I and J.

Table 2a identifies processing parameters for the steel used in experiments 1-20.

Table 2b identifies processing parameters for the steel used in experiments 20-37.

Table 3a identifies various properties of cold-rolled flat steel products obtained in experiments 1-32.

Table 3b identifies various properties of cold-rolled flat steel products obtained in experiments 33-37.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element.

As a preliminary matter, it should be understood that all figures relating to contents of steel compositions specified in the present disclosure are based on weight unless stated otherwise. All otherwise indeterminate percentages in connection with a steel alloy should therefore be understood as figures in percent by weight. In addition, figures for microstructure constituents are each based on area percentages (area %) unless stated otherwise.

That said, one example object of the present disclosure is to provide a flat steel product that can be coupled with an alloy concept based on inexpensively available alloying elements and has an optimal combination of properties for use in automobile construction.

A method of producing such a flat steel product was likewise to be specified.

The invention is based on a steel alloy having alloy constituents and alloy contents matched to one another within narrow limits such that, with use of inexpensive alloying elements and a mode of production that can be conducted in an operationally reliable manner, maximized mechanical properties and optimized surface characteristics are achieved in each case.

Alloy constituents and alloy contents of the steel alloy of the invention are chosen such that, in the event of compliance with the steps stipulated in accordance with the invention, it is reliably possible to produce a high-strength flat steel product having a combination of properties of particular suitability for use in lightweight construction, especially in automobile construction.

Carbon is present in the flat steel product of the invention with contents of 0.06% by weight to 0.1% by weight. A content of at least 0.06% by weight is required in order to reliably achieve the desired strength via the formation of a sufficient amount of martensite. Contents of more than 0.1% by weight, by contrast, would have an adverse effect on suitability for welding.

Silicon is present in the steel of the invention with contents of 0.15%-0.4% by weight. An Si content of 0.15% by weight contributes to hardening of the ferrite. However, an Si content of more than 0.4% by weight entails the risk of formation of silicon oxide at the surface of the steel strip in the course of an annealing treatment conducted in the course of production of the flat steel product, which would complicate the further processing and any optional coating of the flat steel product.

Manganese with a minimum content of 1.5% by weight ensures that the flat steel product of the invention has the required strength. However, Mn contents of more than 2% by weight lead to increased complexity in production. Moreover, manganese above 2% by weight has a tendency to form unwanted segregations.

Aluminum is used for deoxidation and for binding of nitrogen during steel production. For this purpose, a content of up to 0.1% by weight is required. The desired effect occurs in an operationally reliable manner at an aluminum content of 0.02%-0.05% by weight.

Chromium likewise has a strength-enhancing effect in the flat steel product of the invention. For this purpose, a content of at least 0.2% by weight is required. However, excessively high Cr contents lead to a reduction in elongation properties. Therefore, the chromium content is restricted to not more than 0.5% by weight.

The combined strength-enhancing effect of the presence of carbon, silicon, manganese and chromium is assured in accordance with the invention by virtue of the sum of the contents % C, % Si, % Mn, % Cr of these elements established within the above provisions being at least 2.3% by weight (% C+% Si+% Mn+% Cr≥2.3% by weight). In this way, the required strengths are reliably achieved without needing to add microalloying elements or other strength-enhancing elements to the steel of the flat steel product of the invention for the purpose. If the sum total of the contents of C, Si, Mn and Cr, in contrast, exceeds 2.8% by weight, the strength of the flat steel product does rise further. However, this would be associated with an unwanted decrease in fracture elongation. In this case too, the surface characteristics of a flat steel product of the invention would be worsened, since an excessively large total amount of C, Si, Mn and Cr would distinctly promote grain boundary oxidation at high coiling temperatures or annealing temperatures. This is especially true of silicon and additionally also of aluminum. For this reason, the sum total formed from the Al content % Al and Si content % Si in the flat steel product of the invention should be not more than 0.4% by weight.

The inventive setting of the alloy contents of a flat steel product of the invention creates the prerequisites for restriction of grain boundary oxidation to a depth of 5 µm measured from the surface of the steel substrate. If grain boundary oxidation were to extend over a greater depth, this would lead to a distinct deterioration in the surface characteristics. This would be manifested in poor adhesion of a coating applied, for example, as corrosion protection. For instance, as a result of a grain boundary oxidation that penetrates deeper into the steel substrate than 5 µm, there may be detachment of upper grain layers and problems in the further processing of the steel sheet. Especially in the course of forming, elevated notching can occur, which can lead to component failure. By limiting, in accordance with the invention, the sum of the contents of carbon, silicon, manganese and chromium to not more than 2.8% by weight (2.3% by weight≤% C+% Si+% Mn+% Cr≤2.8% by weight) and the sum total of the contents of silicon % Si and aluminum % Al to not more than 0.4% by weight (% Al+% Si≤0.4% by weight), these risks are avoided.

No further alloying elements are envisaged in the steel. More particularly, B, V, Nb, Ti, Mo, Ni, Cu are present in the steel sheet of the invention at most to such a small degree that they have no effect on the properties of the flat steel product and as such can be counted among the technically unavoidable impurities. The addition of any of these elements in effective amounts would increase the strength of the flat steel product of the invention. In return, however, a decline in the fracture elongation and in the n value of the flat steel product would have to be accepted. Therefore, an upper content limit of 0.1% by weight applies to molybdenum, copper and nickel, an upper content limit of 0.01% by weight each to niobium and titanium, an upper content limit of 0.02% by weight to vanadium, and an upper content limit of 0.0006% to boron. P, S and N are also among the unavoidable impurities of the steel substrate of a flat steel product of the invention.

Phosphorus, an accompanying element, in greater contents would worsen the formability and joining characteristics, especially in the welding of the flat steel product of the invention. The phosphorus content should therefore not exceed the upper limit of 0.03% by weight. Optimally, the P content is limited to less than 0.02% by weight.

Sulfur in greater contents would likewise have a crucial adverse effect on the formability of a steel processed in accordance with the invention as a result of MnS formation. For this reason, the S content of a flat steel product of the invention must not be more than 0.006% by weight. In order to reliably rule out the adverse effect of sulfur on the properties of the steel being processed in accordance with the invention, the S content may be limited to max. 0.003% by weight.

Nitrogen is technically unavoidable in flat steel products of the inventive type as an accompanying element in small contents that fall within the range of impurities. However, excessively high nitrogen contents have a crucial adverse effect on aging resistance. In order to prevent this, in a steel being processed in accordance with the invention, the upper limit for the nitrogen content is fixed at 0.008% by weight.

The yield strength Rp0.2 of a flat steel product of the invention is at least 320 MPa. In field testing, flat steel product of the invention have regularly attained yield strengths Rp0.2 of 320-450 MPa.

The tensile strength Rm of flat steel products of the invention is at least 580 MPa, the tensile strengths Rm of flat steel products of the invention in practice regularly being within the range of 580-720 MPa.

At the same time, flat steel products of the invention have a fracture elongation A80 of at least 20% in each case, the fracture elongation A80 of flat steel products of the invention regularly being within the range of 20%-36%.

The n values determined for flat steel products of the invention are at least 0.13. In practice, the n values are 0.13-0.2. The n values have been determined in accordance with DIN ISO 10275:2009-06 in conjunction with DIN EN ISO 6892-1:2009 as $n_{10-20/Ag}$ values.

By virtue of restriction of grain boundary oxidation, as elucidated above, in flat steel products of the invention to a depth of not more than 5 μm proceeding from the surface of the finished flat steel product, a flat steel product of the invention has good suitability for further processing by forming or joining.

Because of their optimal surface characteristics, flat steel products of the invention are particularly suitable for being coated with a coating in a manner known per se to improve their corrosion resistance. The coatings are especially metallic coatings such as Zn-, Mg- or Al-based coatings.

The microstructure of a flat steel product of the invention contains 62-82 area % of ferrite, 10-30 area % of martensite, 1.5-8 area % of residual austenite and a sum total of not more than 10 area % of other microstructure constituents including, for example, pearlite, bainite and cementite, but also carbides.

The martensite content of 10-30 area % present in addition to ferrite, which dominates the microstructure, firstly ensures that the required strength properties are achieved in flat steel products of the invention. At the same time, it is restricted to such a degree that there is no excessive rise in strength at the expense of fracture elongation.

An additional contributing factor to the high minimum fracture elongation A80 of ≥20% is the 1.5-8 area % of residual austenite in the microstructure of the flat steel product of the invention. A proportion exceeding 8 area % of residual austenite would be conserved at the cost of the proportion of martensite, which would again result in the risk that the required strength of the flat steel product of the invention is not attained.

The sum total of the other microstructure constituents present alongside the dominant ferrite and also martensite and residual austenite is sufficiently low that it does not lead to any significant effect on the mechanical properties of the steel, more particularly the yield strength Rp0.2 thereof.

The sum total of the further phases and microstructure constituents that exist alongside ferrite in the microstructure of the flat steel product of the invention, i.e. the sum total of martensite, residual austenite and other microstructure constituents, is optimally at least 18 area %. In this way, it is possible to ensure in an operationally reliable manner that flat steel products alloyed in accordance with the invention attain the required strengths.

In order to ensure that the high fracture elongation desired is attained, it is possible at the same time to restrict the total proportion of the further phases that exist alongside ferrite to not more than 38 area %. Here too, in the case of a total content of the further phases of more than 38 area %, there would be a distinct rise in the tensile strength of flat steel products of the invention, but this would likewise be associated with a distinct decrease in minimum fracture elongation.

The mechanical properties of flat steel products of the invention which are reported here in general terms and in relation to the working examples detailed hereinafter have each been determined on longitudinal specimens according to DIN EN ISO 6892-1:2009, sample form 2 according to DIN EN ISO 6892-1:2009, measurement length 80 mm, sample width 20 mm. The longitudinal samples came from the strip axis, i.e. from a position in the middle of the strip width. The n values were determined here too in accordance with DIN ISO 10275:2009-06 in conjunction with DIN EN ISO 6892-1:2009 as $n_{10-20/Ag}$ values.

To determine the depth of grain boundary oxidation measured from the surface of the steel substrate, a 30 mm-long section from the strip axis aligned with rolling direction through the strip thickness is produced from the finished flat steel product of the invention. For this purpose, the samples are, for example, embedded in synthetic resin, ground in the longitudinal section and polished with a diamond suspension having grains with a mean grain diameter of 1 μm. Subsequently, the section is cleaned with water or alcohol in order to obtain a surface free of specks and streaks.

The grain boundary oxidation become visible in the section image by virtue of dark shading along the grain boundary. The depth of grain boundary oxidation is measured at a magnification of 1000:1 under a light microscope over a measurement length of at least 100 μm in rolling direction. For the assessment of grain boundary oxidation, the greatest value of the penetration depth is cited, i.e. the value where the point at which the grain boundary oxidation has penetrated furthest into the steel substrate is determined, based on the surface at the point in question. The provisions that have been made here and are to be complied with in accordance with the invention in relation to the depth of the grain boundary oxidation therefore mean that the depth value in question is a maximum which is not exceeded in the respective flat steel product of the invention. This should not be taken to mean that the grain boundary oxidation uniformly has this value over a particular larger area. Instead, the penetration depth, based on any greater area, is distributed in each case over a range from 0 μm (no particle boundary oxidation detectable) up to the particular maximum value, which in accordance with the invention does not exceed 5 μm.

For the determination of the microstructure constituents, the longitudinal section made up for the examination of grain boundary oxidation can additionally be prepared in a manner known per se such that the constituents in question become visible. For this purpose, the longitudinal section can be etched with a suitable medium, for example with an alcoholic nitric acid containing a nitric acid content of 3% by volume, also referred to in the jargon as "vital". The sample location at ⅓ or ⅔ of the thickness of the steel sheet is considered here at 1000-fold magnification in the reflected light microscope.

The residual austenite content is determined by means of a microdiffractometer using the same longitudinal section. During the measurement, the acceleration voltage is 35 kV and the current 30 mA. The lower detection limit here is 1% residual austenite.

The method of the invention for production of a flat steel product of the invention comprises the following steps:
a) melting a steel melt consisting (in % by weight) of 0.06%-0.1% C, 0.15%-0.4% Si, 1.5%-2% Mn, 0.2%-0.5% Cr, up to 0.1% Al, where the sum total of the contents of C, Si, Mn and Cr is at least 2.3% and at most 2.8% and the sum total of the contents of Si and Al is at most 0.4%, up to 0.03% P, up to 0.006% S, up to 0.008% N and further technically unavoidable impurities including ≤0.0006% B, ≤0.02% V, and ≤0.01% each of Nb, Ti and ≤0.1% each of Mo, Ni and Cu, and as the remainder of iron;
b) casting the steel melt to form a precursor which is a slab or thin slab;
c) through-heating the precursor to a temperature of 1100-1300° C.;
d) optionally descaling and rough-rolling the through-heated precursor;
e) hot finish-rolling the precursor to form a hot-rolled flat steel product, the temperature (AT) of the precursor at the start of the hot finish-rolling operation being 1050-1150° C. and the temperature (ET) of the hot-finish-rolled flat steel product at the end of the hot finish-rolling operation being 800-950° C.;
f) cooling the hot-finish-rolled flat steel product which has optionally been held for the wait period beforehand to a coiling temperature (HT) of 500-650° C.;
g) coiling the hot-rolled flat steel product which has been cooled to the coiling temperature (HT);
h) cooling the hot-rolled flat steel product in the coil to room temperature;
i) descaling the cooled hot-rolled flat steel product;
j) cold-rolling the hot-rolled flat steel product to a cold-rolled flat steel product, the cold rolling level achieved by means of the cold rolling being 40-85% and the thickness of the cold finish-rolled flat steel product being 0.6-2.9 mm;
k) annealing the cold-rolled flat steel product in a continuous run, by first bringing the flat steel product in one or more steps to an annealing temperature (GT) of 760-860° C. and then keeping it within this annealing temperature region over an annealing period (Gt) which is within an annealing time range having a lower limit of Gtu and upper limit of Gto which are determined as a function of the respective thickness D of the cold-rolled flat steel product as follows:

$$Gtu\ [s]=3.56*D^2\ [s/mm^2]-5.1*D\ [s/mm]+9.8\ s$$

$$Gto\ [s]=-21.4*D^2\ [s/mm^2]+132.8*D\ [s/mm]+47\ s$$

l) cooling the annealed flat steel product in one or more steps to an intermediate temperature ZT of 400-550° C., the cooling being effected at least within the temperature range of 550-650° C. at a cooling rate of 2-100 K/s;
m') melt dip-coating the flat steel product which has been cooled to the intermediate temperature ZT or
m") directly cooling the flat steel product from the intermediate temperature at a cooling rate RK of 0.1-50 K/s to room temperature.

Accordingly, in step a), a steel of a composition in accordance with the alloy envisaged in accordance with the invention for the flat steel product is melted and cast to give a precursor. This can be effected by conventional slab casting or by thin slab casting.

Subsequently, the respective precursor is through-heated in step b) to a temperature of 1100-1300° C. In the case that the melt has been cast to slabs, the slabs obtained are reheated for this purpose to 1100-1300° C., whereas the thin slabs obtained by thin slab casting are optimally kept within this temperature range from the heat of casting. If required, reheating is of course also possible here.

The precursors that have been through-heated at 1100-1300° C., if necessary with regard to the thickness of the hot-finish-rolled flat steel product to be produced, is optionally descaled and rough-rolled in a customary manner in step d). Descaling and rough rolling is typically necessary when slabs of relatively high thickness are being processed. By contrast, these steps, especially the rough rolling, can generally be dispensed with when thin slabs having the dimensions that are nowadays customary are being processed.

The precursors that have been rough-rolled if required are hot-finish-rolled to give a hot-rolled flat steel product having a thickness of not more than 6 mm (step e)). The temperature AT of the precursors on entry into the hot finish rolling relay is 1050-1150° C. The hot-finish-rolled flat steel products leave the hot finish rolling relay at a temperature ET of 800-950° C.

After the hot finish rolling, the hot-rolled flat steel product obtained is cooled in step f) at a mean cooling rate of 30-300 K/s, especially at least 70 K/s, to a coiling temperature of 500-650° C. The crucial factor here is compliance with the coiling temperature, while the performance of the cooling can be matched to an existing plant. For instance, the cooling should preferably be undertaken by means of water, it being possible to interrupt the water cooling with wait periods in which the strip is merely cooled by the surrounding atmosphere (air). In this context, a wide variety of different combinations of water and air cooling phases are conceivable.

It has additionally been found to be appropriate when a mean wait period of 1-15 seconds is observed between the end of finish rolling and the commencement of cooling, in which the hot-rolled flat steel product dwells under air. In this way, uniform recrystallization in the hot strip is achieved, which results in uniform conversion of the microstructure in the course of cooling. This has a positive effect both on the uniformity of the mechanical properties of the hot strip and on the flatness of the hot strip.

At the coiling temperature HT achieved by the cooling, the respective hot-rolled flat steel product is then coiled to give a coil (step g)). A coiling temperature below 500° C. leads to a significantly higher strength and yield strength and would unnecessarily complicate the subsequent cold rolling. Above a temperature of 650° C., the risk of grain boundary oxidation increases. Therefore, coiling should be effected at a maximum coiling temperature of 650° C. A coiling temperature of 530-600° C. has been found to be particularly advantageous with regard to the desired properties of flat steel product produced in accordance with the invention.

The hot-rolled flat steel product is then cooled to room temperature in the coil (step h)).

After cooling in the coil, the hot-rolled flat steel product undergoes a descaling treatment in which the flat steel product is freed of scale adhering thereon by pickling or in another suitable manner (step i)).

In a variant of practical merit with regard to the optimization of the surface characteristics, the descaling is effected by a pickling operation in which the flat steel product is conducted through a pickling tank filled with a pickling acid over a pickling period Bt of 30-250 seconds. The pickling acid may, for example, be 25% sulfuric acid ($H_2SO_4$) heated to a temperature of 70-98° C. Bath temperatures of 85-95° C. have been found to be particularly useful in practical tests. If the pickling time is too short, there is the risk in the case of increased occurrence of scale that scale residues will remain at the strip surface.

The advantage of a pickling treatment is also that the material removal associated with the pickling removes the near-surface layers that could be affected by grain boundary oxidation. However, in the case of too long a pickling time, too much material would be removed, with the result of establishment of surface irregularities. These can cause variations in strip thickness in the finished cold-rolled flat steel product, accompanied by nonuniform mechanical properties. Irregular surfaces, in the case that the finished flat steel product is to be coated with a metallic protective coating, also lead to nonuniform layer formation. This is especially true when the coating is to be applied by hot dip coating.

In step j) which follows, the hot-rolled flat steel product is cold-rolled to give a cold-rolled flat steel product having a thickness of 0.6-2.9 mm. The degree of cold rolling KWG achieved via the cold rolling is 40%-85% (KWG=(dW−D)/dW*100% with dW=thickness of the flat steel product prior to cold rolling and D=thickness of the cold-finish-rolled flat steel product).

The cold-rolled flat steel product then undergoes, in step k), an annealing process executed in a continuous run. In this process, the strip is brought in one or more steps to an annealing temperature GT of 760-860° C. and kept within this annealing temperature range over an annealing period Gt for which Gtu≤Gt≤Gto. The lower limit Gtu and the upper limit Gto in the annealing time Gt reported in seconds is determined as a function of the thickness d of the cold-rolled flat steel product, reported in mm, as follows:

$$Gtu\ [s]=3.56*D^2\ [s/mm^2]-5.1*D\ [s/mm]+9.8\ s$$

$$Gto\ [s]=-21.4*D^2\ [s/mm^2]+132.8*D\ [s/mm]+47\ s$$

The minimum annealing period Gtu and the minimum annealing temperature of 760° C. must not be undershot, since too small a proportion of the austenite is otherwise formed. This would lead to a lower proportion of martensite in the subsequent cooling and hence to lowering of the yield strength and tensile strength. Moreover, it has to be ensured that complete through-heating is achieved particularly in the case of relatively thick strips. Otherwise, based on the strip width, a significantly different microstructure would be established at the lateral edges of the cold-rolled flat steel products than in the middle thereof. The same applies in the case of assessment across the strip thickness. The microstructure in the region of the surface, in the case of too short an annealing period Gt and too low an annealing temperature GT, would be different than in the middle of the thickness of the flat steel product. This would result in highly scattering mechanical properties. By compliance with the provisions made in accordance with the invention with regard to the annealing period Gt and annealing temperature GT, by contrast, a flat steel product that features a particularly homogeneous distribution of properties is obtained. In the event of exceedance of the maximum annealing period Gto or annealing temperatures GT of more than 860° C., there would be the risk of grain boundary oxidation or of the formation of unwanted oxides at the surface of the flat steel product. The unwanted oxides whose formation is prevented by the procedure of the invention include iron oxide, manganese oxide, aluminum oxide, silicon oxide or chromium oxide.

The hot-rolled flat steel product, prior to the cold rolling, is pickled for descaling and for removal of surface layers afflicted by grain boundary oxidation. In this case, with regard to minimization of grain boundary oxidation, within the provisions of the invention, the coiling temperature HT, the annealing temperature GT, the annealing period Gt and the pickling period Bt are matched to one another according to the following formula:

$$(HT*GT*Gt)/Bt^2 \leq 50000$$

In the event of compliance with this condition and observation of the other provisions of the invention, it is possible to assure with optimal operational reliability that grain boundary oxidation is always restricted to a layer bordering the surface of the steel substrate and having a depth of not more than 5 μm. At the same time, by compliance with this condition, the formation of excessively coarse microstructure is reliably avoided, which would again lower strength of the flat steel product.

After the annealing, the cold-rolled flat steel product is cooled to an intermediate temperature ZT of 400 to 550° C. (step l)). This cooling can be conducted in one or more steps. What is crucial is that, within a temperature range of 650° C. to 550° C., a cooling rate of at least 2 K/s and at most 100 K/s is observed. In this way, the formation of pearlite in the flat steel product alloyed in accordance with the invention can be very substantially avoided. A large proportion of pearlite in the microstructure would lead to lowering of the strength. If the cooling rate of 100 K/s were to be exceeded, this would result in formation of an excessive proportion of martensite, which would again lead to distinct lowering of the fracture elongation.

At the intermediate temperature ZT of 400° C. to 550° C., in a first variant, a melt dip coating of the flat steel product can be conducted. Preference is given to using, for this purpose, coating baths having a proportion of at least 75% by weight of zinc. After the melt dip coating, it is optionally possible to conduct a galvannealing process, in which case reheating is effected to a maximum of 450-550° C. This is followed by subsequent cooling to room temperature. Both the further conditions of the melt dip coating and the conditions of the optionally conducted galvannealing treatment correspond to those that are customary in the prior art.

As an alternative to a melt dip coating operation, the flat steel product, in a second variant of the process of the invention, can be cooled continuously from the intermediate temperature ZT without a coating treatment at cooling rates of 0.1 K/s to 50 K/s in one or more steps to room temperature. Optionally, in this variant, electrolytic coating is possible after the cooling to room temperature.

Irrespective of whether the flat steel product has been provided with a coating or has remained untreated, the flat steel product can optionally be skin-rolled, in which case the skin-rolling should be effected with a degree of cold rolling of not more than 1.5%. If higher degrees of skin rolling are employed, the yield strength is increased, but an excessively high loss of fracture elongation would have to be accepted in return.

The invention is elucidated in detail hereinafter with reference to working examples.

Figure 1:
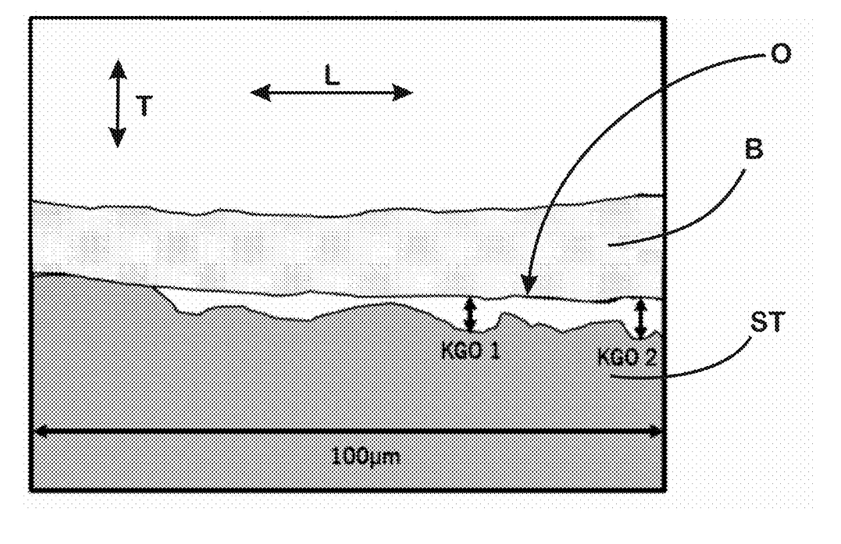
FIG. 1 is a schematic detail view of an example section of a flat steel product.

FIG. 1 shows, in schematic form, a detail of a section of a flat steel product sample taken from the strip axis which has been made up for the determination of the maximum penetration depth KGO of grain boundary oxidation as a section aligned to rolling direction.

The respective penetration depths KGO1, KGO2, . . . of the grain boundary oxidation which have been determined in the flat steel products produced in the manner elucidated individually hereinafter have accordingly been measured over a measurement length of 100 µm aligned in rolling direction as the respective distance measured in thickness direction T, i.e. transverse to the longitudinal extent L of the sample, between the surface O of the steel substrate ST and the point in the steel substrate ST where no grain boundary oxidation was detectable any longer at the respective measurement site. It was possible to cover the steel substrate ST with a metallic protective coating B. In this case too, the measurement of the respective penetration depth KGO1, KGO2, . . . proceeded from the surface O of the steel substrate ST.

From the set of the measurements KGO1, KGO2, . . . thus detected systematically in the form of distances distributed over the longitudinal direction L, the maximum has then been determined (in FIG. 1 the measurement "KGO2") and assigned to the flat steel product under examination in each case as the penetration depth "KGO" of the grain boundary oxidation.

To test the invention, inventive melts A-H and additionally two noninventive comparative melts I, J with the compositions specified in table 1 have been melted and cast to slabs.

The slabs which serve as precursor have subsequently been through-heated in experiments 1-37 to a rough-rolling temperature VT and rough-rolled in a conventional manner with this temperature.

Thereafter, the slabs have been introduced with a hot rolling start temperature AT into a hot finish-rolling relay in which they have been hot-finish-rolled in a likewise conventional manner to give a hot-rolled flat steel product having a thickness dW.

The hot-finish-rolled flat steel products have left the hot rolling relay with a hot rolling end temperature ET and have then been cooled at a cooling rate of 30-300K/s to a coiling temperature HT. Between the end of the hot rolling and the start of cooling was a mean wait period Pt in each case.

The hot-rolled flat steel products which have been cooled to the coiling temperature HT have been coiled to form a coil and cooled down to room temperature in the coil.

Subsequently, the hot-rolled flat steel products have passed through a pickling bath heated to 90° C., which consisted of 25% sulfuric acid ($H_2SO_4$) within a pickling period Bt.

The flat steel products which have thus been pickled have then each been cold-rolled with a degree of cold rolling KWG to give cold-rolled flat steel products which had a thickness D.

The cold-rolled flat steel products have been subjected to an annealing treatment in a continuous run, in which they have been kept at an annealing temperature GT over an annealing period Gt.

After the annealing, the flat steel products, proceeding from the annealing temperature GT, have been cooled at a cooling rate AK to an intermediate temperature ZT, from which they have then been cooled to room temperature at a cooling rate RK.

The flat steel products have been subjected to various surface treatments. For instance, as well as untreated samples, some samples have been hot dip-coated, others hot dip-coated and galvannealing-treated, and other samples again have been electrolytically coated.

Finally, the cold-rolled flat steel products have been subjected to a skin-rolling operation in which they have been cold-rolled with a degree of cold rolling D°.

Tables 2a and 2b report, for experiments 1-37, the steel alloys of the precursors processed in each case and the respective operating parameters rough-rolling temperature VT, hot rolling start temperature AT, hot rolling end temperature ET, wait period Pt, coiling temperature HT, hot strip thickness dW, pickling period Bt, degree of cold rolling KWG, thickness of the cold-rolled flat steel product d, annealing temperature GT, annealing period Gt, cooling rate AK, cooling temperature ZT, the respective cooling rate RK of the second cooling stage, degree of skin rolling D° and the product Gt*GT*HT/Bt². In the column "OF", the samples that have remained uncoated are identified by "U", the samples that have been hot dip-coated only by "SB", the samples that have been hot dip-coated and galvannealing-treated by "SB,GA" and the galvannealing temperature, and the electrolytically coated samples by "EB". Experiments 1-32 have been conducted in an inventive manner both with regard to the alloy of the slabs processed in each case and with regard to the operating parameters, whereas, in experiments 33-37, at least the alloy of the steel processed or one of the operating parameters were not in accordance with the invention.

For the cold-rolled flat steel products obtained in experiments 1-37, the yield strength Rp0.2, tensile strength Rm, fracture elongation A80, n value, penetration depth of grain boundary oxidation KGO, and also ferrite content F, martensite content M, residual austenite content RA, sum total "Others" of the other constituents of the microstructure, and the sum total Σ formed from the martensite content M, residual austenite content RA and the sum total "Others" have been determined in the manner already elucidated above. The results of these studies are compiled in tables 3a and 3b.

These results show that the flat steel products alloyed in accordance with the invention and produced in experiments 1-32 conducted in accordance with the invention each have a high fracture elongation A80 of more than 21% coupled with yield strengths Rp0.2 of more than 330 MPa and tensile strengths of more than 580 MPa.

If the steel of the respective flat steel product, as illustrated by the example of steel I, has too high a sum total of the contents of C, Mn, Cr and Si, the flat steel product manufactured from this noninventive steel, by contrast, does not attain the required fracture elongation of at least 20%, even if it is otherwise produced in an inventive manner (see experiment 33).

Comparative alloy J contains, by contrast with the provisions of the invention, titanium in effective amounts, which means that, even in the case of production otherwise in conformance with the invention (experiment 33), the strength values are increased, but the required fracture elongation is not attained. The n value determinable for this example is also too low.

Experiment 37, which does proceed from the steel melt A alloyed in accordance with the invention but has not been processed in accordance with the invention because of too short a pickling period, contrary to the recommendation of the invention, demonstrates that, by virtue of a sufficiently long pickling period, not just the scale residues but also the incipient grain boundary oxidation can be removed from the strip surface in such a way that the depth of the grain boundary oxidation remains restricted to the range prescribed in accordance with the invention.

Comparative experiment 36, which likewise proceeds from steel A alloyed in accordance with the invention but has not been processed in accordance with the invention in relation to the duration of annealing of the cold strip, additionally demonstrates that an excessively long annealing period also promotes grain boundary oxidation and leads to penetration depths well above the upper limit of not more than 5 µm which is permissible in accordance with the invention. It is also the case that, as a result of the excessively long annealing period after the cooling, the sum total of the other constituents aside from ferrite in the microstructure of the flat steel product produced in experiment 36, i.e. the sum total formed from the martensite, residual austenite and the other phases, is too small.

Finally, comparative experiment 35 shows that, when the duration of annealing of the cold-rolled flat steel product is below the minimum duration stipulated in accordance with the invention, too little austenite is formed. The result of this is that too low a proportion of martensite is formed, accompanied by too low a sum total of the microstructure constituents other than ferrite present in the microstructure, as a result of which, in turn, there is a drop in the mechanical properties of the flat steel product produced in comparative experiment 35 compared to the flat steel products produced in accordance with the invention.

TABLE 1

| | Steel | C | Si | Mn | Al | Cr | P | S | Cu | Nb | Mo | N | Ti | V | Ni | B | C + Mn + Cr + Si | Si + Al |
|---|---|---|---|---|---|---|---|---|---|---|---|---|---|---|---|---|---|---|
| INVEN- | A | 0.086 | 0.225 | 1.8 | 0.037 | 0.307 | 0.015 | 0.003 | 0.02 | 0.001 | 0.013 | 0.0039 | 0.002 | 0.001 | 0.022 | 0.0003 | 2.418 | 0.262 |
| TION | B | 0.095 | 0.2 | 1.53 | 0.05 | 0.48 | 0.013 | 0.0018 | 0.016 | 0.002 | 0.007 | 0.0051 | 0.001 | 0.002 | 0.024 | 0.0005 | 2.305 | 0.250 |
| | C | 0.08 | 0.251 | 1.93 | 0.025 | 0.224 | 0.02 | 0.001 | 0.02 | 0.007 | 0.011 | 0.0057 | 0.004 | 0.008 | 0.019 | 0.0003 | 2.485 | 0.276 |
| | D | 0.075 | 0.231 | 1.98 | 0.072 | 0.349 | 0.009 | 0.0034 | 0.02 | 0.001 | 0.027 | 0.005 | 0.003 | 0.004 | 0.03 | 0.0006 | 2.635 | 0.303 |
| | E | 0.072 | 0.309 | 1.77 | 0.061 | 0.251 | 0.011 | 0.001 | 0.01 | 0.004 | 0.01 | 0.0044 | 0.005 | 0.01 | 0.04 | 0.0003 | 2.402 | 0.370 |
| | F | 0.064 | 0.278 | 1.64 | 0.053 | 0.323 | 0.01 | 0.0007 | 0.019 | 0.001 | 0.003 | 0.007 | 0.001 | 0.003 | 0.07 | 0.0004 | 2.305 | 0.331 |
| | G | 0.083 | 0.354 | 1.84 | 0.04 | 0.308 | 0.017 | 0.0026 | 0.042 | 0.005 | 0.019 | 0.0047 | 0.006 | 0.001 | 0.023 | 0.0005 | 2.585 | 0.394 |
| | H | 0.091 | 0.332 | 1.82 | 0.036 | 0.387 | 0.012 | 0.0028 | 0.018 | 0.002 | 0.045 | 0.0052 | 0.006 | 0.002 | 0.021 | 0.0005 | 2.63 | 0.368 |
| Compar- | I | 0.083 | 0.382 | 1.95 | 0.033 | 0.473 | 0.015 | 0.0016 | 0.017 | 0.001 | 0.016 | 0.0056 | 0.002 | 0.001 | 0.022 | 0.0003 | 2.888 | 0.415 |
| ison | J | 0.087 | 0.208 | 1.63 | 0.037 | 0.316 | 0.008 | 0.0005 | 0.009 | 0.001 | 0.0025 | 0.0045 | 0.025 | 0.003 | 0.017 | 0.0004 | 2.241 | 0.245 |

All figures in % by weight, remainder iron and other unavoidable impurities

TABLE 2a

| | Steel | Experiment | Hot rolling | | | | | | Pickling | Cold rolling | | Annealing | | | | | | | | |
|---|---|---|---|---|---|---|---|---|---|---|---|---|---|---|---|---|---|---|---|---|
| | | | VT [°C.] | AT [°C.] | ET [°C.] | Pt [s] | HT [°C.] | dW [mm] | Bt [s] | KWG [%] | D [mm] | GT [°C.] | Gt [s] | AK [K/s] | ZT [°C.] | RK [K/s] | OF | D° [%] | Gt*GT* HT/Bt² |
| INVEN- | A | 1 | 1250 | 1100 | 925 | 5 | 580 | 4.45 | 73 | 66 | 1.5 | 850 | 16 | 10 | 490 | 7.3 | SB | 0.6 | 1480 |
| TION | | 2 | 1250 | 1125 | 900 | 7 | 640 | 4.45 | 84 | 66 | 1.5 | 820 | 167 | 9 | 490 | 0.5 | SB | 0.6 | 12421 |
| | | 3 | 1300 | 1100 | 910 | 5 | 570 | 5.15 | 230 | 51 | 2.5 | 840 | 60 | 51 | 490 | 3.2 | SB | 0.5 | 543 |
| | | 4 | 1250 | 1100 | 900 | 2 | 580 | 4.45 | 121 | 66 | 1.5 | 810 | 11 | 7 | 500 | 2.3 | SB, GA (500° C.) | 0.8 | 353 |
| | B | 5 | 1250 | 1100 | 900 | 0 | 520 | 4.45 | 83 | 66 | 1.5 | 780 | 19 | 9 | 460 | 42.4 | SB | 0.1 | 1119 |
| | | 6 | 1100 | 1050 | 925 | 0 | 580 | 4.45 | 47 | 66 | 1.5 | 840 | 122 | 2 | 460 | 13.8 | U | 0.7 | 26907 |
| | | 7 | 1150 | 1100 | 910 | 0 | 560 | 3.30 | 41 | 70 | 1.0 | 830 | 55 | 4 | 485 | 1.5 | U | 0.5 | 15208 |
| | | 8 | 1250 | 1100 | 900 | 0 | 580 | 1.80 | 59 | 67 | 0.6 | 840 | 11 | 8 | 485 | 21.3 | SB | 0.3 | 1540 |
| | C | 9 | 1250 | 1100 | 800 | 2 | 520 | 4.45 | 73 | 66 | 1.5 | 800 | 219 | 5 | 465 | 6.9 | U | 0.9 | 17096 |
| | | 10 | 1175 | 1100 | 900 | 6 | 580 | 3.75 | 90 | 73 | 1.0 | 800 | 19 | 4 | 470 | 11.1 | SB, GA (550° | 0.9 | 1088 |

TABLE 2a-continued

| Steel | Experiment | Hot rolling VT [°C.] | AT [°C.] | ET [°C.] | Pt [s] | HT [°C.] | dW [mm] | Pickling Bt [s] | Cold rolling KWG [%] | D [mm] | Annealing GT [°C.] | Gt [s] | AK [K/s] | ZT [°C.] | RK [K/s] | OF | D° [%] | Gt*GT* HT/Bt$^2$ |
|---|---|---|---|---|---|---|---|---|---|---|---|---|---|---|---|---|---|---|
| | 11 | 1250 | 1100 | 930 | 0 | 610 | 4.60 | 67 | 57 | 2.0 | 850 | 215 | 70 | 540 | 1.0 | SB | 0.6 | 24833 |
| | 12 | 1225 | 1100 | 900 | 14 | 580 | 4.00 | 55 | 63 | 1.5 | 815 | 12 | 7 | 470 | 7.2 | SB | 0.8 | 1875 |
| D | 13 | 1250 | 1100 | 915 | 3 | 580 | 4.45 | 140 | 66 | 1.5 | 780 | 60 | 2 | 440 | 32.3 | SB, GA (480° C.) | 1.2 | 1385 |
| | 14 | 1250 | 1100 | 900 | 8 | 580 | 5.50 | 40 | 49 | 2.8 | 820 | 53 | 2 | 475 | 0.1 | U | 1 | 15754 |
| | 15 | 1175 | 1100 | 900 | 6 | 570 | 3.30 | 54 | 70 | 1.0 | 810 | 80 | 53 | 525 | 1.9 | U | 0.6 | 12667 |
| | 16 | 1250 | 1100 | 900 | 1 | 640 | 4.45 | 48 | 66 | 1.5 | 850 | 175 | 26 | 475 | 0.7 | EB | 0.3 | 41319 |
| E | 17 | 1250 | 1100 | 850 | 9 | 580 | 4.45 | 165 | 66 | 1.5 | 805 | 17 | 11 | 460 | 50 | SB | 0.5 | 292 |
| | 18 | 1175 | 1125 | 900 | 12 | 580 | 1.80 | 75 | 67 | 0.6 | 810 | 80 | 31 | 485 | 3.9 | SB | 0.4 | 6682 |
| | 19 | 1200 | 1100 | 910 | 0 | 560 | 3.30 | 62 | 70 | 1.0 | 815 | 55 | 46 | 485 | 24.0 | SB | 0.6 | 6530 |
| | 20 | 1125 | 1100 | 900 | 15 | 580 | 4.45 | 180 | 66 | 1.5 | 800 | 95 | 24 | 490 | 37.0 | EB | 0.3 | 1360 |

TABLE 2b

| | Steel | Experiment | Hot rolling VT [°C.] | AT [°C.] | ET [°C.] | Pt [s] | HT [°C.] | dW [mm] | Pickling Bt [s] | Cold rolling KWG [%] | D [mm] | Annealing GT [°C.] | Gt [s] | AK [K/s] | ZT [°C.] | RK [K/s] | OF | D° [%] | Gt*GT* HT/Bt$^2$ |
|---|---|---|---|---|---|---|---|---|---|---|---|---|---|---|---|---|---|---|---|
| INVENTION | F | 21 | 1250 | 1075 | 910 | 0 | 580 | 4.45 | 107 | 66 | 1.5 | 820 | 15 | 20 | 530 | 3.3 | U | 0.8 | 623 |
| | | 22 | 1300 | 1150 | 950 | 0 | 580 | 4.45 | 99 | 66 | 1.5 | 815 | 38 | 9 | 510 | 0.2 | SB | 0.8 | 1833 |
| | | 23 | 1200 | 1075 | 830 | 0 | 570 | 4.60 | 86 | 57 | 2.0 | 850 | 80 | 35 | 485 | 1.3 | SB | 0.6 | 5241 |
| | | 24 | 1250 | 1100 | 900 | 0 | 580 | 4.45 | 46 | 66 | 1.5 | 830 | 16 | 5 | 495 | 6.1 | SB | 1.4 | 3640 |
| | G | 25 | 1250 | 1100 | 900 | 11 | 580 | 3.75 | 41 | 73 | 1.0 | 795 | 100 | 15 | 500 | 0.3 | SB | 0.3 | 27430 |
| | | 26 | 1125 | 1075 | 850 | 4 | 580 | 4.45 | 55 | 66 | 1.5 | 810 | 183 | 6 | 475 | 2.4 | U | 0.3 | 28421 |
| | | 27 | 1225 | 1100 | 840 | 4 | 550 | 5.15 | 78 | 51 | 2.5 | 860 | 190 | 3 | 485 | 29.8 | U | 0.5 | 14772 |
| | | 28 | 1225 | 1125 | 900 | 7 | 580 | 4.00 | 58 | 63 | 1.5 | 810 | 184 | 27 | 500 | 7.0 | SB | 0.6 | 25697 |
| | H | 29 | 1300 | 1150 | 950 | 9 | 580 | 4.45 | 108 | 66 | 1.5 | 800 | 58 | 18 | 480 | 0.4 | SB | 0.5 | 2307 |
| | | 30 | 1250 | 1125 | 890 | 0 | 580 | 4.45 | 190 | 66 | 1.5 | 850 | 16 | 8 | 480 | 2.7 | EB | 0.5 | 219 |
| | | 31 | 1125 | 1150 | 880 | 10 | 550 | 5.15 | 133 | 51 | 2.5 | 800 | 230 | 4 | 460 | 15.3 | EB | 0.8 | 5721 |
| | | 32 | 1250 | 1125 | 900 | 6 | 580 | 5.50 | 60 | 49 | 2.8 | 830 | 27 | 5 | 530 | 27.8 | SB | 0.5 | 3611 |
| COMPARISON | I | 33 | 1250 | 1100 | 900 | 5 | 580 | 4.45 | 59 | 66 | 1.5 | 820 | 13 | 7 | 490 | 7.0 | SB | 0.8 | 1776 |
| | J | 34 | 1250 | 1100 | 900 | 7 | 580 | 4.45 | 61 | 66 | 1.5 | 820 | 14 | 5 | 490 | 7.8 | SB | 0.3 | 1789 |
| | A | 35 | 1250 | 1100 | 900 | 7 | 580 | 4.45 | 69 | 66 | 1.5 | 810 | 5 | 7 | 500 | 7.5 | SB | 0.8 | 493 |
| | A | 36 | 1250 | 1100 | 900 | 6 | 580 | 4.45 | 58 | 66 | 1.5 | 810 | 210 | 7 | 500 | 6.9 | SB | 0.8 | 29328 |
| | A | 37 | 1250 | 1100 | 900 | 5 | 580 | 4.45 | 10 | 66 | 1.5 | 810 | 13 | 9 | 490 | 7.3 | SB | 0.5 | 61074 |

TABLE 3a

| | Steel | Experiment | Rp0.2 [MPa] | Rm [MPa] | A80 [%] | n value | KGO [μm] | Microstructure [area %] F | M | RA | Others | Σ |
|---|---|---|---|---|---|---|---|---|---|---|---|---|
| INVENTION | A | 1 | 401 | 656 | 24.3 | 0.143 | 0.5 | 75 | 20 | 2.5 | 2.5 | 25.0 |
| | | 2 | 399 | 658 | 24.6 | 0.143 | 4.5 | 80 | 15 | 4.0 | 1.0 | 20.0 |
| | | 3 | 396 | 647 | 25.3 | 0.168 | 2.0 | 75 | 15 | 6.0 | 4.0 | 25.0 |
| | | 4 | 416 | 693 | 22.6 | 0.141 | 0.0 | 70 | 25 | 3.5 | 1.5 | 30.0 |
| | B | 5 | 379 | 601 | 26.1 | 0.179 | 1.0 | 80 | 15 | 4.5 | 0.5 | 20.0 |
| | | 6 | 396 | 604 | 25.8 | 0.132 | 4.0 | 80 | 15 | 1.5 | 3.5 | 20.0 |
| | | 7 | 385 | 640 | 27.9 | 0.170 | 1.5 | 70 | 20 | 5.5 | 4.5 | 30.0 |
| | | 8 | 375 | 668 | 21.9 | 0.156 | 0.0 | 75 | 20 | 2.5 | 2.5 | 25.0 |
| | C | 9 | 376 | 685 | 21.6 | 0.155 | 1.5 | 65 | 30 | 4.5 | 0.5 | 35.0 |
| | | 10 | 386 | 666 | 20.6 | 0.152 | 0.5 | 75 | 15 | 3.5 | 6.5 | 25.0 |
| | | 11 | 398 | 627 | 26.5 | 0.149 | 4.5 | 70 | 25 | 3.5 | 1.5 | 30.0 |
| | | 12 | 362 | 635 | 23.7 | 0.160 | 0.0 | 80 | 15 | 3.5 | 1.5 | 20.0 |
| | D | 13 | 341 | 683 | 23.6 | 0.163 | 2.5 | 70 | 20 | 4.0 | 6.0 | 30.0 |
| | | 14 | 355 | 701 | 23.2 | 0.142 | 2.0 | 65 | 30 | 2.5 | 2.5 | 35.0 |
| | | 15 | 372 | 634 | 25.3 | 0.178 | 3.0 | 75 | 20 | 5.0 | 0.0 | 25.0 |
| | | 16 | 333 | 669 | 22.8 | 0.171 | 4.5 | 65 | 25 | 5.0 | 5.0 | 35.0 |
| | E | 17 | 336 | 644 | 23.7 | 0.175 | 0.5 | 70 | 20 | 3.5 | 6.5 | 30.0 |
| | | 18 | 346 | 636 | 27.5 | 0.150 | 2.5 | 75 | 15 | 7.0 | 3.0 | 25.0 |
| | | 19 | 383 | 645 | 27.0 | 0.172 | 1.5 | 65 | 25 | 5.5 | 4.5 | 35.0 |
| | | 20 | 331 | 626 | 24.1 | 0.149 | 2.0 | 80 | 15 | 2.5 | 2.5 | 20.0 |

TABLE 3a-continued

| Steel | Experiment | Rp0.2 [MPa] | Rm [MPa] | A80 [%] | n value | KGO [μm] | Microstructure [area %] | | | | |
|---|---|---|---|---|---|---|---|---|---|---|---|
| | | | | | | | F | M | RA | Others | Σ |
| F | 21 | 340 | 582 | 25.8 | 0.162 | 0.0 | 80 | 10 | 6.0 | 4.0 | 20.0 |
| | 22 | 343 | 604 | 25.3 | 0.173 | 1.0 | 75 | 20 | 4.0 | 1.0 | 25.0 |
| | 23 | 390 | 616 | 27.6 | 0.151 | 2.5 | 70 | 15 | 6.5 | 3.5 | 25.0 |
| | 24 | 350 | 587 | 25.7 | 0.145 | 0.5 | 80 | 15 | 2.0 | 3.0 | 20.0 |
| G | 25 | 380 | 698 | 21.3 | 0.157 | 3.5 | 70 | 25 | 1.5 | 3.5 | 30.0 |
| | 26 | 383 | 651 | 23.1 | 0.164 | 0.5 | 70 | 20 | 4.5 | 5.5 | 30.0 |
| | 27 | 355 | 663 | 25.4 | 0.143 | 3.0 | 75 | 20 | 3.0 | 2.0 | 25.0 |
| | 28 | 415 | 686 | 22.8 | 0.151 | 3.5 | 70 | 25 | 2.0 | 3.0 | 30.0 |
| H | 29 | 388 | 659 | 24.2 | 0.157 | 1.0 | 80 | 15 | 3.5 | 1.5 | 20.0 |
| | 30 | 362 | 681 | 22.2 | 0.150 | 0.5 | 70 | 25 | 3.0 | 2.0 | 30.0 |
| | 31 | 350 | 673 | 24.1 | 0.163 | 4.0 | 75 | 20 | 3.0 | 2.0 | 25.0 |
| | 32 | 342 | 635 | 25.4 | 0.155 | 1.0 | 80 | 15 | 4.5 | 0.5 | 20.0 |

TABLE 3b

| | Steel | Experiment | Rp0.2 [MPa] | Rm [MPa] | A80 [%] | n value | KGO [μm] | Microstructure [area %] | | | | |
|---|---|---|---|---|---|---|---|---|---|---|---|---|
| | | | | | | | | F | M | RA | Others | Σ |
| COMPARISON | I | 33 | 402 | 751 | 17.8 | 0.136 | 6.5 | 60 | 35 | 3.5 | 1.5 | 40.0 |
| | J | 34 | 392 | 727 | 19.1 | 0.122 | 0.5 | 65 | 35 | 0.0 | 0.0 | 35.0 |
| | A | 35 | 357 | 562 | 26.3 | 0.161 | 0.0 | 85 | 5 | 4.5 | 5.5 | 15.0 |
| | A | 36 | 341 | 552 | 23.9 | 0.172 | 7.5 | 90 | 5 | 2.5 | 2.5 | 10.0 |
| | A | 37 | 365 | 615 | 24.4 | 0.165 | 7.0 | 80 | 15 | 3.5 | 1.5 | 20.0 |

What is claimed is:

1. A cold-rolled flat steel product having a yield strength Rp0.2 of 320-450 MPa, a tensile strength of 580-720 MPa, a fracture elongation A80 of at least 20%, and a microstructure having in percent area 62%-82% ferrite, 10%-30% martensite, 1.5%-8% residual austenite, and a total of not more than 10% other microstructure constituents, wherein the flat steel product comprises a steel alloy comprising in percent by weight:
   0.06%-0.1% C;
   0.15%-0.4% Si;
   1.5%-2% Mn;
   0.2%-0.5% Cr;
   not more than 0.1% Al,
   not more than 0.03% P;
   not more than 0.006% S;
   not more than 0.008% N;
   unavoidable impurities; and
   iron,
   wherein a sum total of C, Si, Mn, and Cr is at least 2.3% and at most 2.8%,
   wherein a sum total of Si and Al is at most 0.4%.

2. The cold-rolled flat steel product of claim 1 wherein the unavoidable impurities comprise:
   not more than 0.0006% B;
   not more than 0.02% V;
   not more than 0.01% each of Nb and Ti; and
   not more than 0.1% each of Mo, Ni, and Cu.

3. The flat steel product of claim 1 comprising 0.02%-0.05% by weight Al.

4. The flat steel product of claim 1 wherein a sum total of area proportions of the martensite, the residual austenite, and the other microstructure constituents of the microstructure is at least 18% by area.

5. The flat steel product of claim 1 wherein a sum total of area proportions of the martensite, the residual austenite, and the other microstructure constituents of the microstructure is at least 38% by area.

6. A method of producing a flat steel product comprising:
   melting a steel melt comprising in percent by weight:
   0.06%-0.1% C,
   0.15%-0.4% Si,
   1.5%-2% Mn,
   0.2% 0.5% Cr,
   up to 0.1% Al,
   up to 0.03% P,
   up to 0.006% S,
   up to 0.008% N,
   unavoidable impurities, and
   iron,
   wherein a sum total of C, Si, Mn, and Cr is at least 2.3% and at most 2.8%,
   wherein a sum total of Si and Al is at most 0.4%;
   casting the steel melt to form a precursor that is a slab;
   through-heating the precursor to a temperature of 1100-1300° C.;
   hot finish-rolling the precursor to form a hot-rolled flat steel product, a temperature of the precursor at a start of the hot finish-rolling being 1050-1150° C. and a temperature of the hot-finish-rolled flat steel product at an end of the hot finish-rolling being 800-950° C.;
   cooling the hot-finish-rolled flat steel product to a coiling temperature of 500-650° C.;
   coiling the hot-rolled flat steel product that has been cooled to the coiling temperature;
   cooling the hot-rolled flat steel product in a coil to room temperature;
   descaling the cooled hot-rolled flat steel product;
   cold-rolling the hot-rolled flat steel product to a cold-rolled flat steel product, wherein the cold rolling is 40-85% and a thickness of the cold finish-rolled flat steel product is 0.6-2.9 mm;
   annealing the cold-rolled flat steel product in a continuous run, by first bringing the flat steel product to an annealing temperature of 760-860° C. and then keeping the flat steel product within the annealing temperature over an annealing period that is within an annealing time range having a lower limit of Gtu and an upper limit of Gto, wherein the upper and lower limits Gto, Gtu are determined as a function of a respective thickness D of the cold-rolled flat steel product such that $Gtu$ [s]=3.56*$D^2$ [s/mm$^2$]−5.1*$D$ [s/mm]+9.8 s $Gto$ [s]=−21.4*$D^2$ [s/mm$^2$]+132.8*$D$ [s/mm]+47 s cooling the annealed flat steel product to an intermediate temperature of 400-550° C., the cooling being effected at least within a temperature range of 550-650° C. at a cooling rate of 2-100 K/s; and performing at least one of:

melt dip-coating the flat steel product that has been cooled to the intermediate temperature, or directly cooling the flat steel product from the intermediate temperature at a cooling rate of 0.1-50 K/s to room temperature, wherein the finished flat steel product has a yield strength Rp0.2 of 320-450 MPa, a tensile strength of 580-720 MPa, a fracture elongation A80 of at least 20%.

7. The method of claim 6 wherein the unavoidable impurities comprise:

not more than 0.0006% B;

not more than 0.02% V;

not more than 0.01% each of Nb and Ti; and not more than 0.1% each of Mo, Ni, and Cu.

8. The method of claim 6 further comprising descaling and rough-rolling the through-heated precursor.

9. The method of claim 6 further comprising maintaining the hot-finish-rolled flat steel product under air over a period of 1-15 seconds between the hot finish-rolling and the cooling.

10. The method of claim 6 wherein the hot-rolled flat steel product is cooled at a cooling rate of 30-300 K/s.

11. The method of claim 6 wherein the coiling temperature is 530-600° C.

12. The method of claim 6 further comprising pickling the hot-rolled flat steel product for descaling by passing the hot-rolled flat steel product through a pickling tank filled with a pickling acid for a pickling time of 30-250 seconds.

13. The method of claim 12 wherein the coiling temperature, the annealing temperature, the annealing time, and the pickling time have values such that

[(coiling temperature)×(annealing temperature)×(annealing time)]/(pickling time)≤50000.

14. The method of claim 6 further comprising:

melt dip-coating the flat steel product that has been cooled to the intermediate temperature; and subjecting the flat steel product to a galvannealing treatment.

15. The method of claim 14 further comprising heating the melt dip-coated flat steel product to a temperature of 450-550° C. for the galvannealing treatment.

16. The method of claim 6 wherein after the annealed flat steel product is cooled down to the intermediate temperature of 400-550° C., the method comprises cooling the flat steel product down directly to room temperature and then coating the flat steel product electrolytically with an anticorrosion coating.

17. The method of claim 6 further comprising skin-rolling the flat steel product.

18. The method of claim 17 wherein a degree of cold deformation achieved via the skin rolling is not more than 1.5%.

* * * * *